United States Patent [19]

Caillol et al.

[11] Patent Number: 4,737,800

[45] Date of Patent: Apr. 12, 1988

[54] ELECTRICAL SUPPLY FOR A THERMAL PRINTING HEAD

[75] Inventors: Alain Caillol, Malakoff; Bernard Mouchet, Paris, both of France

[73] Assignee: Enertec, Montrouge, France

[21] Appl. No.: 900,913

[22] Filed: Aug. 27, 1986

[30] Foreign Application Priority Data

Sep. 2, 1985 [FR] France ................................ 85 13000
Jul. 31, 1986 [FR] France ................................ 86 11089

[51] Int. Cl.⁴ ........................ G01D 15/10; H05B 3/02; B41J 3/20

[52] U.S. Cl. ................................ 346/76 PH; 219/216; 219/482; 219/483; 219/485; 400/120

[58] Field of Search .................... 346/76 PH; 219/216, 219/482–486; 400/120

[56] References Cited

U.S. PATENT DOCUMENTS

| | | | |
|---|---|---|---|
| 4,113,391 | 9/1978 | Minowa | 400/120 |
| 4,168,421 | 9/1979 | Ito | 219/216 |
| 4,268,838 | 5/1981 | Nakano et al. | 346/76 PH |

FOREIGN PATENT DOCUMENTS

| | | | |
|---|---|---|---|
| 2350200 | 12/1977 | France | 400/120 |

OTHER PUBLICATIONS

High Speed Thermal Recording–Proceedings of the S.I.D., vol. 21, No. 2, 1980, pp. 165–160, Los Angeles, U.S., Katsuhisa Saito et al.

IBM Technical Disclosure Bulletin, vol. 22, No. 5, Oct. 1979, p. 2023, New York, U.S. Thermal Print Head Power Supply Regulator, G. M. Heiling et al.

*Primary Examiner*—Clifford C. Shaw
*Assistant Examiner*—Gerald E. Preston
*Attorney, Agent, or Firm*—Dale Gaudier

[57] ABSTRACT

Method and device to supply, from a source of alternating voltage (5*a* or 5*b*), a thermal printing head (3) comprising a number of heater units (3*a*, 3*b*).

The device comprises a means (6*a* to 6*d*) of obtaining a rectified voltage, a means (8) of detecting the points when the alternating voltage or the rectified voltage change to zero and to produce a detection signal, a means (9) of synchronizing, with this detection signal, the heating of particular heater units and a means (7*a*, 7*b*) to absorb current.

14 Claims, 6 Drawing Sheets

FIG. 1
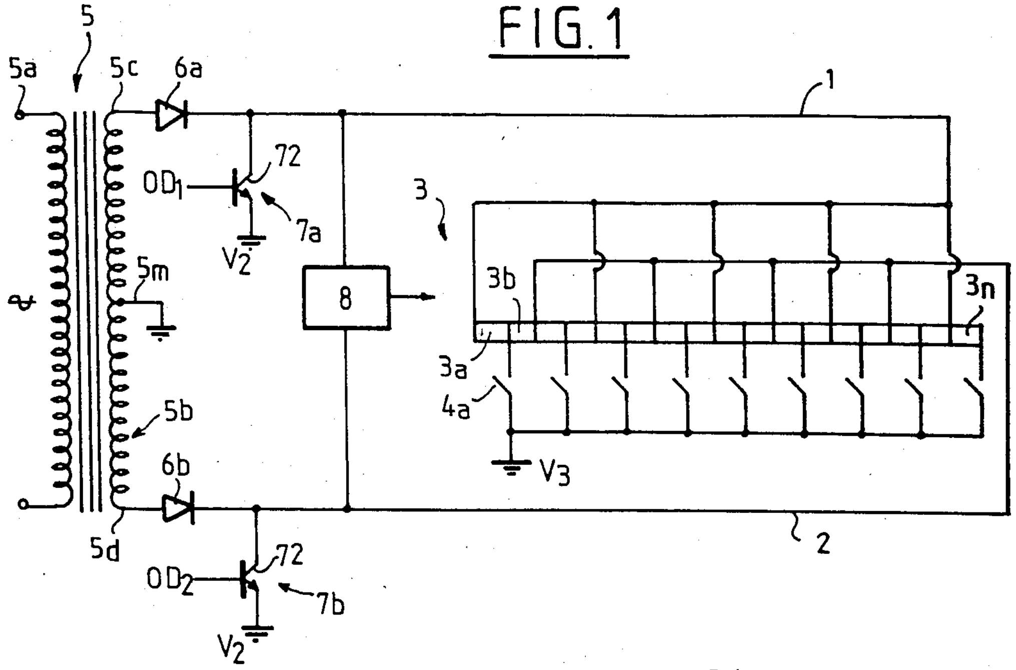
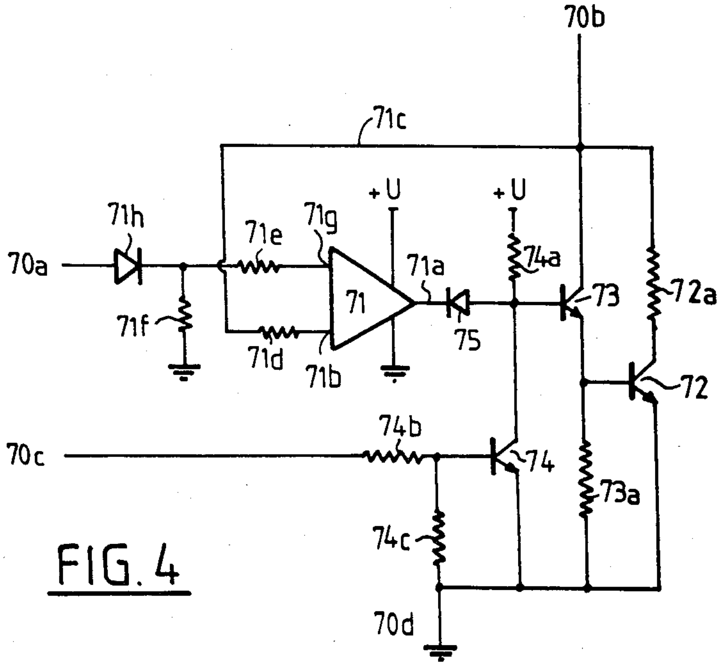
FIG. 4

FIG. 7
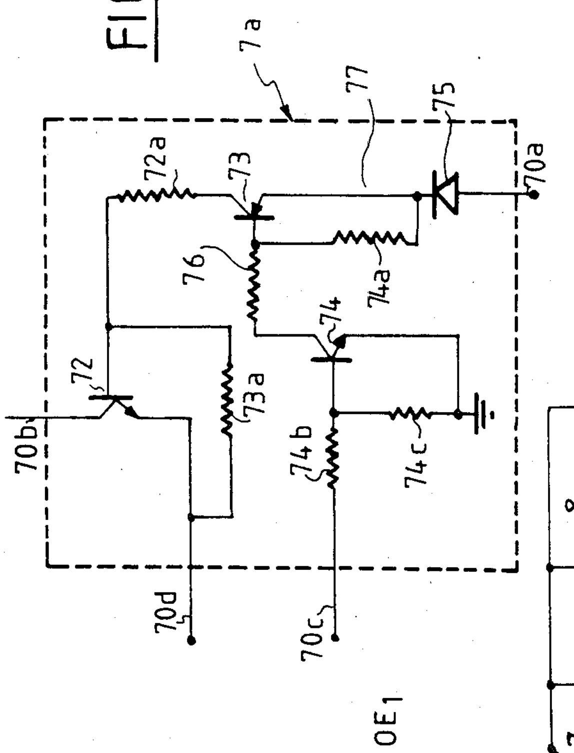
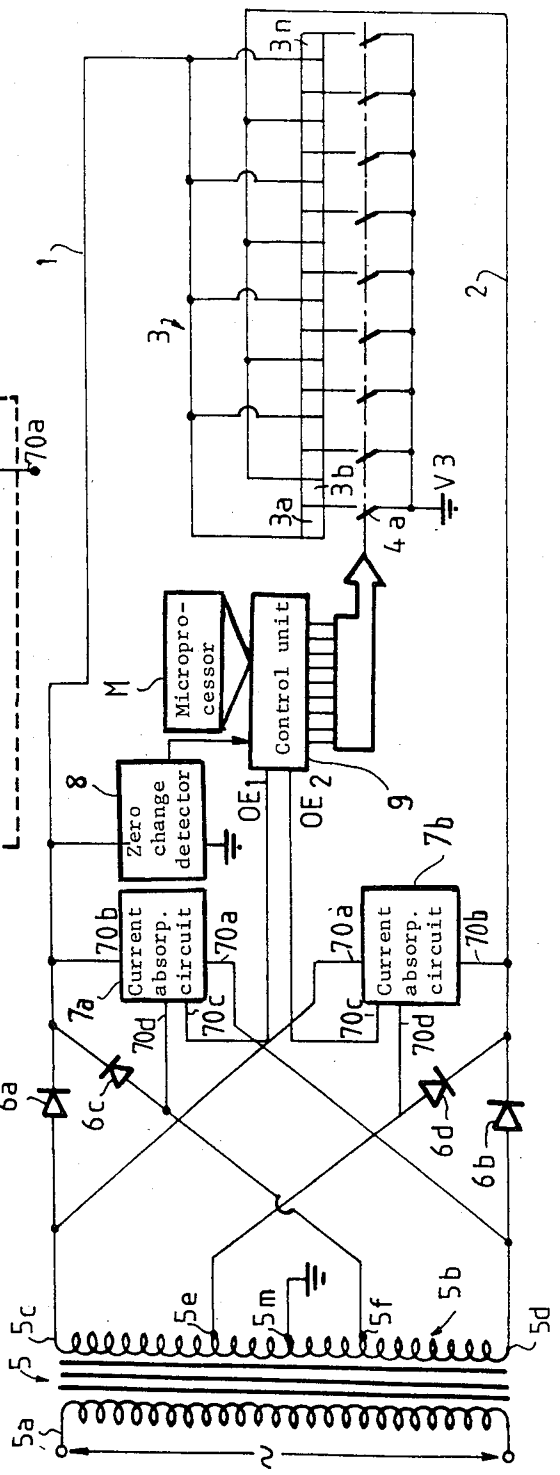
FIG. 6

ELECTRICAL SUPPLY FOR A THERMAL PRINTING HEAD

TECHNICAL FIELD

This invention principally relates to a device providing an electrical supply to a thermal printing head comprising adjoining pairs of heater units, where the first and second heater units of each pair are connected to the respective first and second conductors, these being capable of being raised, in that order or in reverse order, to first and second potentials and where any heater unit is capable of being connected to a third potential to provide a relatively high, or relatively low, increase in temperature, depending on whether it is, or is not directly connected between the first and third potentials.

BACKGROUND ART

Printing heads of this type, known as "interleaved bipolar heads with two common conductors" are well-known to persons skilled in the art.

Although the use of two current input conductors (the two "common conductors") enable the design of these thermal heads to be simplified, the electrical supply to these heads has, up to the present time, required the use of relatively complex and expensive circuits, which notably restrict development of this type of head.

In particular, when the supply originates from an alternating voltage source, the supply circuits normally include a means of filtering and regulation, intended to provide the head with a constant and uniform supply of electrical energy at all times.

DISCLOSURE OF INVENTION

The purpose of this invention is to propose a device and supply method for a thermal printing head which, contrary to known techniques, results in a very simple construction.

For this purpose, the device according to the invention and intended to be connected to a source of alternating voltage is basically characterised by the fact that it includes an input transformer which is designed to receive the alternating voltage and which comprises a secondary winding with a mid-point connected to the earth and also at least first and second main output terminals, provided on the secondary winding each side of the mid-point and connected to the first and second conductors respectively, first and second current rectifier units respectively introduced between the first and second transformer output terminals and the first and second conductors, together with first and second current absorption circuits, connected respectively to the first and second conductors and designed to absorb at least part of the current circulating respectively in the second and first conductors.

The device therefore controls the temperature rise in the heater units, in synchronisation with the alternating voltage supplied to the transformer.

In accordance with a first embodiment, the first and second potentials are fixed at the same value.

In accordance with a second embodiment, in addition to the main output terminals, the transformer includes first and second auxiliary output terminals, respectively arranged on the secondary winding between the said mid-point and the said first and second main output terminals and respectively connected to the second and first conductors, together with third and fourth current rectifier units respectively introduced between the said second and first auxiliary terminals and the said first and second conductors.

Each current absorption circuit also includes, for preference, a voltage follower, designed to maintain the potential of the conductor to which it is connected basically at the same value as the potential of the auxiliary terminal to which this conductor is connected, together with an active component capable of being controlled so that it may adopt an electrically conductive state or a non-conductive state, this component being capable of permitting or inhibiting the said current absorption, depending on its state or condition.

Preferably, the device according to the invention also includes a control unit, such as a microprocessor, capable of connecting at least certain of the said heater units to the third potential, together with a zero change detector for the alternating voltage and intended to supply a time base signal to the said control unit.

In the second embodiment of the device according to the invention, the control unit may control the active component in order to permit current absorption when the number of heater units controlled is less than one-quarter of the total number of heater units comprising the head.

In accordance with the two first embodiments described above, the output terminal for each absorption circuit is connected to the earth.

In accordance with a third embodiment, which enables current to be absorbed in a more advantageous manner, as regards the simplicity of circuit design and efficiency, the output terminal for the first (respectively second) current absorption circuit is connected to the secondary of the transformer, between the second (respectively first) main terminal and the earth.

This always ensures that, during the absorption stage, the conductors corresponding to the second potential are forced, in a simple manner, without the need for a voltage follower.

As the absorption circuit output terminal is connected to the secondary, instead of being connected to the earth as in the case of first and second embodiments described above, the difference in potential at the terminals of this circuit is reduced. This limits the power dissipated in the circuit and therefore avoids the need to use components fitted with a means of thermal protection, with the consequent advantages in cost reduction and overall size.

Also, the transformer may function with increased efficiency due to the fact that it must supply a smaller current.

More particularly, in accordance with this third embodiment, the output terminal of the first (respectively second) current absorption curciut is connected to the secondary winding of the transformer at a point situated close to the second (respectively first) auxiliary terminal.

Preferably, the output terminal for the first (respectively) second absorption circuit is connected to the second (respectively first) auxiliary terminal for the secondary.

Preferably, the first (respectively the second) current absorption circuit includes a current input terminal connected to the first (respectively second) conductor, a control terminal, an output terminal and a voltage supply terminal connected to a potential with a value substantially exceeding the potential of the second (respectively first) auxiliary terminal for the transformer secondary.

Preferably, the voltage supply terminal for the first (respectively second) absorption circuit is connected to a point on the transformer secondary situated between the second (respectively first) auxiliary terminal and the second (respectively first) main terminal.

In accordance with a preferred embodiment, the said point situated on the secondary corresponds to a potential exceeding that of the corresponding auxiliary terminal, its value being between 5 to 50 per cent of the latter, preferably between 20 and 30 per cent.

In order to achieve a simple design, the voltage supply terminal for the first (respectively second) current absorption circuit is connected to the second (respectively first) main terminal of the secondary.

The invention also concerns a method designed to provide a supply for a thermal printing head, from a source of alternating voltage, comprising a number of heater units, characterised in that it includes the following operations:

- to rectify the said alternating voltage and obtain a rectified voltage;
- to detect those points where the alternating voltage or the rectified voltage change to zero and to provide the corresponding detection signal, and
- to synchronise the heating stage for particular heater units with this detection signal.

The invention will be more fully understood by referring to the appended figures, where:

BRIEF DESCRIPTION OF DRAWING

FIG. 1 is a diagram showing a first embodiment of producing the device in accordance with the invention;

FIG. 4 is a diagram showing one of the current absorption circuits used in the device of FIG. 3;

FIG. 6 is a diagram of a third method of producing the device in accordance with the invention;

FIG. 7 is a diagram showing a variant relating to one of the current absorption circuits used in the device of FIG. 6;

Figure 5:
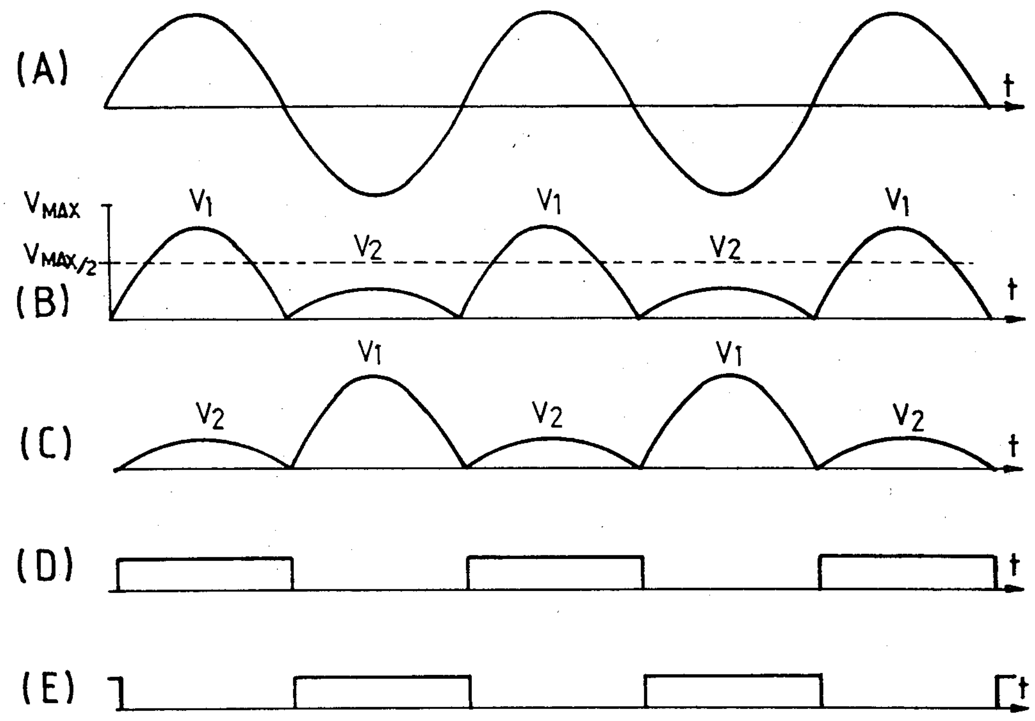
FIG. 5 constitutes FIGS. 5A to 5E and represents various different signals associated with the device shown in FIGS. 3 and 6.

As far as possible, those components providing equivalent or similar functions are identified by identical references or are only differentiated by a letter.

BEST MODES FOR CARRYING OUT THE INVENTION

FIG. 1 represents a thermal printing head with two common conductors, that is, with two current input conductors 1 and 2, this head being generally designated by the reference 3.

This head comprises heater units such as **3*a*, 3*b*, constituting resistances arranged in pairs on each side of control switches or cutouts, such as 4*a***, these comprising transistors.

The first heater unit, such as **3*a*, of each pair, such as 3*a*, 3*b*, is connected to the first conductor 1 whereas the other, such as 3*b*, is connected to the second conductor 2**.

The first and second conductors are capable of being raised, in that order or in the reverse order, to the first and second potentials $V_1$, $V_2$. Also, any heater unit may be connected to a third potential $V_3$ (that for the earth on FIGS. 1 and 2), through a control switch or cutout such as **4*a***.

The values for the differences in potential $V_1 - V_3$ and $V_2 - V_3$ are selected so that a heater unit is only sufficiently heated to enable it to print on thermosensitive paper, or print by thermal transfer, if it is connected directly between potentials $V_1$ and $V_3$.

In accordance with the first embodiment for producing the device shown in FIG. 1, the second potential $V_2$ is selected as being equal to the earth potential, so that the difference $V_2 - V_3$ is nil.

The device of FIG. 1 includes an input transformer 5 comprising a primary winding **5*a*, directly connected to a source of alternating voltage, and a secondary winding 5*b*. The mid-point 5*m* of the secondary winding 5*b* is connected to the earth. The extreme output terminals 5*c*, 5*d* for the secondary winding 5*b* are connected to the respective conductors 1 and 2 through current rectifier units such as the diodes 6*a*, 6*b***.

First and second current absorption circuits **7*a*, 7*b* are respectively connected to the first and second conductors 1 and 2 further away from diodes 6*a*, 6*b*, relative to the transformer 5**.

In the device shown in FIG. 1, these current absorption circuits are in the form of transistors 72 capable, under the influence of signals $OD_1$ and $OD_2$ respectively, of connecting the first and second conductors 1 and 2 to the earth potential constituting the second potential $V_2$.

The device of FIG. 1 also includes a detector 8 which registers changes to zero of the alternating voltage supplying the transformer 5. The role of this detector 8 will be explained in detail with reference to FIG. 3.

Figure 2:
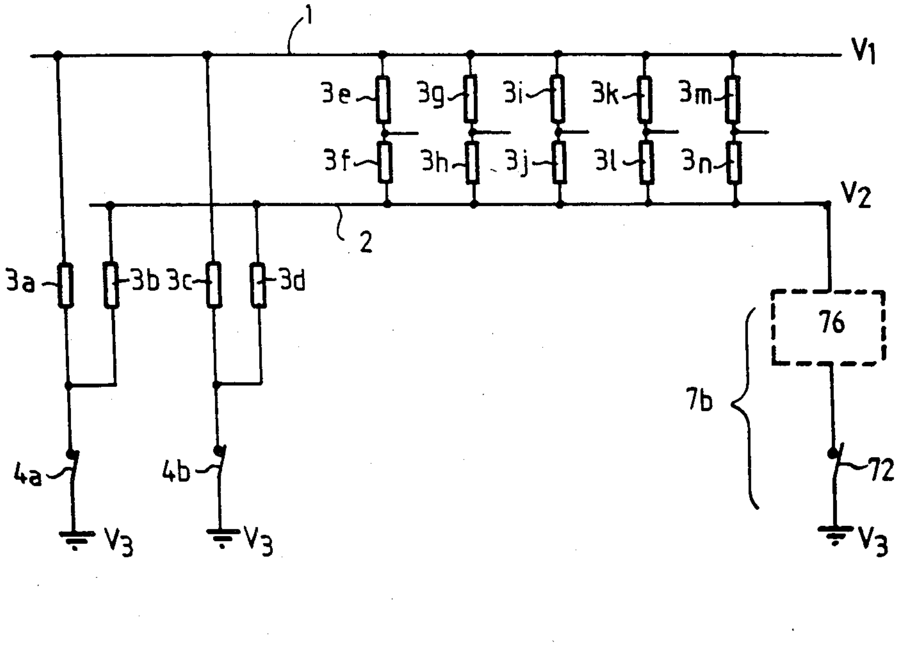
FIG. 2 is an electrical diagram equivalent to the thermal printing head and the associated circuits.

The functioning of the device shown in FIG. 1 will be more fully understood by referring to FIG. 2, this corresponding to the electrical diagram for the head 3.

This figure represents the heater units **3*a* to 3*n* for the head, the conductors 1 and 2, the potentials $V_1$ to $V_3$, the control switches or cutouts 4*a*, 4*b* and the current absorption circuit 7*b*. Circuit 7*b* includes element 76 and a cutout or switch, such as transistor 72, for reducing circuit 7*b* (it is therefore assumed that the block 76 shown in dotted lines is not inserted in the conductor connecting $V_2$ to $V_3$ through 72**).

FIG. 2 corresponds to one alternation of the alternating voltage where the conductor raised to a specific positive potential $V_1$ is the first conductor 1 and where units **3*a* and 3*c*** only are controlled in order to print the thermosensitive material.

The potential $V_2$, which is therefore applied to the second conductor 2, is made equal to the potential for the earth $V_3$ by controlling transistor 72 in the pass condition, this being symbolised by a closed switch. The heater units **3*b*, 3*d* are subjected to a nil potential difference $V_2 - V_3$, the heater units 3*e* to 3*n* being grouped in pairs between conductors 1 and 2 and individually subjected to a difference in potential $(V_1 - V_2)/2$ and the units controlled 3*a* and 3*c*** are each subject to a difference in potential $V_1 - V_3 = V_1 - V_2$.

As the Joule effect in a heater unit is proportional to the square of the difference in potential at the terminals of that unit, the temperature increase for units 3*e* to 3*n* is four times lower than that for units 3*a* and 3*c*. The potentials $V_1$, $V_2$ and $V_3$ are selected so that only the units controlled 3*a*, 3*c* are capable of printing thermo-sensitive material.

When the transistor 72, comprising (in accordance with the first embodiment) the current absorption circuit 7*b*, is in the pass condition (case shown in FIG. 2), the transistor constituting the current absorption circuit 7*a* (FIG. 1) is blocked. During the following alternation cycle, the second conductor 2 is raised to the first potential $V_1$, the transistor 72 for circuit 7*a* is in the pass condition in order to absorb the current originating in the second conductor and the transistor 72 for circuit 7*b* is blocked. Therefore, in the case where it is necessary (for example, when the number of heater units controlled is less than one quarter of the total number of units), the current absorption stage will relate to the current circulating in the conductor raised to $V_2$ and originating in the conductor raised to $V_1$.

The alternate absorption effect for each circuit follows the principle whereby the heating sequences for the heater units are synchronised on the alternating voltage.

Figure 3:
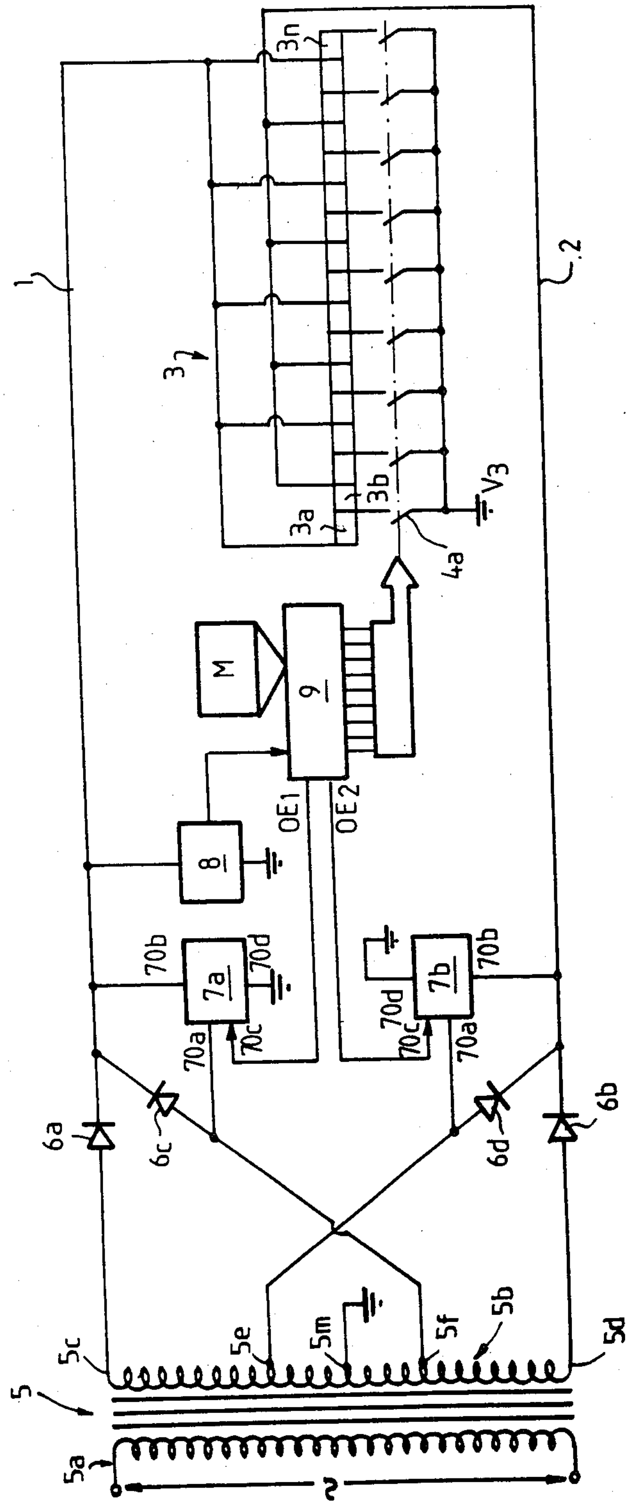
FIG. 3 is a diagram of a second embodiment of producing the device covered by the invention.

FIG. 3 shows a second more complete embodiment of producing the invention. The figure shows the conductors 1 and 2, together with the head 3 and several heater units such as 3*a*, control switches or such as 4*a* used to connect these heater units to a third potential $V_3$ (which, in this case, is the earth potential), the transformer 5, which has a secondary winding 5*b* with a mid-point 5*m* connected to the earth and two main output terminals 5*c*, 5*d*, current rectifier diodes 6*a*, 6*b* respectively inserted between terminals 5*c*, 5*d* and the conductors 1 and 2, the current absorption circuits 7*a*, 7*b* connected respectively to conductors 1 and 2, and the zero change detector 8.

The components which are not shown on FIG. 1 and represented for the first time on FIG. 3 are as follows:

The secondary 5*b* of transformer 5 includes two auxiliary output terminals 5*e*, 5*f* situated respectively between the mid-point 5*m* and the main output terminals 5*c*, 5*d* of this transformer. Third and fourth diodes 6*c*, 6*d* are respectively introduced between the second and first auxiliary terminals 5*f*, 5*e* and the first and second conductors 1 and 2. Finally, the device shown in FIG. 3 includes a control unit, such as microprocessor 9.

Also, although basically fulfilling the same initial function, the absorption circuits 7*a*, 7*b* shown in FIG. 3 do not have the same arrangement as those for FIG. 1.

FIG. 4 represents a possible embodiment for the current absorption circuits 7*a*, 7*b* of FIG. 3.

As these circuits are preferably identical, one circuit only will be described and the references used will be valid for both circuits.

Each circuit comprises: a voltage supply terminal 70*a* connected to the second auxiliary output 5*f* of transformer 5 for circuit 7*a* and to the first auxiliary output 5*e* for circuit 7*b*, a current input terminal 70*b* connected to the first conductor 1 for circuit 7*a* and to the second conductor 2 for circuit 7*b*, a control terminal 70*c* and an output terminal 70*d* connected, in this case, to the earth potential.

Each circuit 7*a*, 7*b* of FIG. 3 includes a voltage follower, such as an operational amplifier 71 where the output 71*a* is looped onto the negative input 71*b* of this amplifier 71 through a feedback coupling 71*c* connected to the current input terminal 70*b*.

The amplifier 71, associated with resistances 71*d*, 71*e*, 71*f* receives, on its positive input side 71*g*, the voltage from auxiliary terminal 5*f* or 5*e* to which it is connected through a diode 71*h*.

Each current absorption circuit 7*a*, 7*b* also includes a controlled active component comprising a transistor 72 connecting the terminals 70*b* and 70*d* through a resistance 72*a*. The base of transistor 72 is connected to the emitter of a transistor 73, where the collector is connected to the terminals 70*b* and also to the current output terminal 70*d* through a resistance 73*a*. The base of the transistor 73 is itself connected to the collector of a transistor 74, where the emitter is connected to current output terminal 70*d* and also to a source of constant potential +U, through a resistance 74*a*. The base of the transistor 73 is also connected to the output 71*a* of the amplifier 71 by a diode 75 polarised in the direction "transistor 73 - amplifier 71".

The base of the transistor 74 is connected to the control terminal 70*c* through a resistance 74*b* and the output terminal 70*d* through another resistance 74*c*.

The functioning of the absorption circuit shown in FIG. 4 is illustrated by the signals represented in FIG. 5.

FIG. 5A represents, in terms of time t, the amplitude of the alternating voltage at the terminals of the primary winding 5*a* for transformer 5.

FIGS. 5B and 5C represent, in terms of time, the respective values of the potentials for conductors 1 and 2, relative to earth.

These figures show that the conductors are, at any time, at different potentials $V_1$ and $V_2$ and that each conductor is alternately at potential $V_1$ and $V_2$.

Preferably, the auxiliary output terminals 5*e* and 5*f* are each situated at approximately one-third of the secondary winding between the earth and the corresponding main output terminal 5*c*, 5*d*, so that the potential $V_2$ is approximately equal to one-third of potential $V_1$. In fact, when the diode 6*a* permits the potential $V_1$ to be established, diode 6*d* allows potential $V_2$ to be established, that is, approximately $V_1/3$, the diodes 6*b* and 6*c*, energised in the opposite direction, being blocked. Similarly, when diode 6*b* allows potential $V_1$ to be established, the diode 6*c* allows potential $V_2$ to be established, that is, approximately $V_1/3$, diodes 6*a* and 6*d* then being blocked.

FIGS. 5D and 5E represent respectively signals $OE_1$ and $OE_2$ applied to the respective control inputs 70*c* for the current absorption circuits 7*a* and 7*b* by microprocessor 9.

The effect of these signals $OE_1$ and $OE_2$ is to permit or inhibit current absorption in circuits 7*a*, 7*b*, as may be seen by referring to FIG. 4 which is supposed to represent circuit 7*a* used in the device shown on FIG. 3.

When the signal $OE_1$ applied to control input 70*c* of this circuit is at a high level, transistor 74 is in the pass condition and directs the earth potential present on output terminal 70*d* onto the base of transistor 73.

Transistor 73 is then blocked and also transistor 72. No current absorption due to a shunt or bypass to terminal 70*d* can then take place.

When, on the other hand, signal $OE_1$ applied to control input 70*c* of circuit 7*a* is at a low level, transistor 74 is blocked. The base of the transistor 73 is polarised by the voltage +U and transistor 73 is in the pass condition. The current circulating in resistance 73*a* polarises the base of transistor 72 which also becomes conductive.

Transistor 72 then connects the current input terminals 70*b* and current output terminals 70*d*, which results in current absorption by shunting to terminal 70*d*. On the other hand, output 71*a* of amplifier 71 is looped onto the input 71*b* of this latter through transistor 73. The amplifier 71 then functions as a voltage follower and maintains terminal 70*b*, that is, conductor 1, in this case, at the potential for terminal 70*a*, that is, as is shown in FIGS. 5D and 5B, at potential $V_2$, that is, approximately $V_1/3$.

In this second operational condition, corresponding to a low level for control signal $OE_1$, transistor 72 fulfills the same function as transistor 72 for circuit 7*a* of FIG. 1, that is, it permits absorption of the current circulating in the first conductor 1.

Functioning of circuit 7*b* shown in FIG. 3 is the same as that of circuit 7*a* which has just been described, the current absorption phases being simply displaced, relative to those for circuit 7*a*, by one half-cycle of the alternating voltage represented in the FIG. 5A.

At present, the description shows, in particular, the similarities between the devices shown in FIGS. 1 and 3. However, there is an important difference between these devices which will be basically explained by referring to FIG. 2. On this figure, the block 76 represents, generally and functionally, the absorption circuit of FIG. 4, except for the transistor 72 which is represented separately in the form of a switch or output.

In the device shown in FIG. 1, the potential for one of the conductors is fixed by the potential for terminal 5*c* or terminal 5*d* of the secondary for transformer 5, but the potential of the other conductor is forced to the value of the earth potential to which this other conductor is connected by transistor 72 in the pass condition. If transistor 72 does not carry out this function of shunting the current to earth, for example, if it is still blocked and if the number of heater elements controlled is small relative to the total number of heater units (for example, less than one-quarter), the floating potential $V_2$ would approach the level of potential $V_1$ and the heater units such as 3*b*, associated with the heater units controlled such as 3*a*, would be the origin of an excessive temperature rise, this resulting in an undesirable impression by these associated units on the thermosensitive paper.

If, always assuming that the transistor 72 remains blocked, the number of heater units controlled is large relative to the total number of heater units (for example, approximately one-half), the floating potential $V_2$ would approach the value of potential $V_3$ so that the heater units not controlled would be subject to a considerable difference in potential, this resulting in an undesirable functioning of these components.

It is therefore necessary, as regards the device shown in FIG. 1, that the transistor 72, at all times, shunts or bypasses current to earth.

On the other hand, for the device shown in FIG. 3, the potentials of the two conductors 1 and 2 are a priori fixed by the potentials available at the main and auxiliary terminals of the secondary 5*b* for the transformer 5 and none of these potentials are therefore floating.

However, in reality, this is only true if the secondary of the transformer provides a current for conductors 1 and 2.

In effect, the diodes 6*c* and 6*d* which prevent any current feedback for conductors 1 and 2 towards the transformer, do not permit the potential of these conductors to be fixed at a pre-determined value when these conductors must supply current. It is therefore necessary for the current absorption circuits 7*a*, 7*b* to absorb the current in this latter case.

Calculations show that each current absorption circuit for FIG. 4 only needs to be controlled, in order to absorb the current, if the number of heater units controlled is less than one-quarter of the total number of units. In order to determine this difference, the control signals are identified by $OD_1$ and $OD_2$ on FIG. 1 and by $OE_1$ and $OE_2$ on FIG. 3.

Another difference between the devices shown in FIGS. 1 and 3 is that, in the first, the heater units not controlled are subject to a difference in potential $(V_1-V_2)/4$, that is, $V_1/4$, as $V_2$ is nil. However, in the second case, those heater units which are not controlled are only subject to a difference in potential $(V_1-V_2)/4$ equal to $V_1/6$, as $V_2$ is equal to $V_1/3$.

A first (FIG. 1) and a second (FIG. 3) embodiment of the device according to the invention have already been described, where the output terminal 70*d* for each current absorption circuit is connected to the earth.

FIG. 6 represents a third embodiment, where each absorption circuit 7*a*, 7*b* comprises an output terminal 70*d* which is not now connected to earth but to the secondary of the transformer.

Components which are identical or have the same function and shown respectively in FIGS. 3 and 4, and FIGS. 6 and 7 have identical references. The only differences between the respective devices of FIGS. 3 and 6 relate to the terminal connections for each absorption circuit 7*a*, 7*b* and are explained below.

FIG. 7 represents one of the current absorption circuits associated with the device shown in FIG. 6. These absorption circuits are preferably identical and one circuit only will be described (by referring to FIG. 7) and the references used will be valid for both circuits.

Each absorption circuit comprises: a voltage supply terminal 70*a* connected, in accordance with the example described, to the second main terminal 5*d* of transformer 5 in the case of circuit 7*a* and to the first main terminal 5*c* in the case of circuit 7*b*, one current input terminal 70*b* connected to the first conductor 1 for circuit 7*a* and to the second conductor 2 for circuit 7*b*, a control terminal 70*c*, together with a current output terminal 70*d* connected, in accordance with this third embodiment, to the secondary of the transformer and, more precisely, to the second auxiliary terminal 5*f* in the case of circuit 7*a* and to the first auxiliary terminal 5*e* in the case of circuit 7*b*.

Each current absorption circuit 7*a*, 7*b* also includes a controlled active component, comprising a transistor 72, connecting the current input terminals 70*b* and the current output terminals 70*d*. The base of transistor 72 is connected to the collector of a type PNP transistor 73 through a resistance 72*a*, where the emitter is connected to the terminal 70*a* through a diode 75 polarised in the direction "terminal 70*a* - transistor 73" and also to the current output terminal 70*d* through a resistance 73*a*. The base of transistor 73 is itself connected through resistance 76 to the collector of a transistor 74, where the emitter is connected to the earth and, also, through a resistance 74*a* to the conductor 77 connecting the emitter of transistor 73 and the voltage supply terminal 70*a*. The base of the transistor 74 is connected to the control terminal 70*c* through a resistance 74*b* and to the earth through another resistance 74*c*.

The functioning of the current absorption circuit shown in FIG. 7 is illustrated by the signals represented in FIG. 5, the relative significance having been given earlier.

The effects of signals $OE_1$ and $OE_2$ are to permit or inhibit the absorption of the current for circuits 7*a*, 7*b*, as may be understood by referring to FIG. 7 which is supposed to represent the circuit 7*a*.

When the signal $OE_1$ applied to the control input 70*c* of this circuit is at a sufficiently high positive potential (high level), the transistor 74 is in a pass condition and directs, onto the base of transistor 73, a potential such that the voltage $V_{BE}$ for transistor 73 is positive, transistor 73 then being blocked. The transistor 72 is then also blocked. Current absorption by shunting to terminal 70*d* cannot then occur.

On the other hand, when the signal $OE_1$ applied to the control input 70*c* of circuit 7*a* is at a low level, the transistor 74 is blocked and the voltage $V_{BE}$ for transistor 73 is negative, permitting the transistor to conduct. The current circulating in resistance 73*a* polarises the base of transistor 72 which also become conductive.

Transistor 72 then connects current input terminal 70*b* and current output terminal 70*d*, resulting in current being absorbed by shunting to terminal 70*d*. In this second operational condition, corresponding to a low level for control signal $OE_1$, transistor 72 permits absorption of the current circulating on the first conductor 1. This fully corresponds with the function which each absorption circuit should satisfy. In effect, the potentials of the two conductors 1 and 2 are fixed by the potentials available at the main and auxiliary terminals for the secondary, if this delivers a current onto conductors 1 and 2. However, the diodes 6*c* and 6*d* which prevent a current feedback from conductors 1 and 2 to the transformer do not permit the potential of these conductors to be fixed at a predetermined value when these conductors must supply current.

In this latter case, the current must be absorbed. As indicated earlier, each current absorption circuit only needs to be controlled, in order to absorb the current, in the case of a given ratio between the number of heater units controlled and the total number of units.

The functioning of absorption circuit 7*b* in FIG. 6 is the same as that of circuit 7*a* which has just been described, the current absorption phases being simply displaced, relative to those for circuit 7*a*, by a half-cycle of the alternating voltage represented in FIG. 5A.

If it is supposed, for example, that units 3*a* and 3*c* must be controlled when printing, when the potential $V_2$ is applied to the second conductor 2, heater units 3*b*, 3*d* are subject to a difference in potential $V_2$ equal to $V_1/3$ whereas heater units 3*e* to 3*n*, grouped in pairs between conductors 1 and 2, are individually subjected to a difference in potential $(V_1-V_2)/2$, equal to $V_1/3$ and the units controlled 3*a* and 3*c* are each subjected to a difference in potential $V_1-V_3=V_1$ (as $V_3$ is connected to the earth).

As the Joule effect in a heater unit is proportional to the square of the difference in potential at the terminals of that unit, the temperature increase for units 3*e* to 3*n* and units 3*b* to 3*d* is nine times less than that for units 3*a* and 3*c*.

The third embodiment described above referring to FIGS. 6 and 7 where the output terminal 70*d* of each absorption circuit 7*a*, 7*b* is connected to the corresponding auxiliary terminal of the transformer secondary, is only an example of a preferred embodiment.

As a variant, the said terminal 70*d* may be connected at any point of the secondary, between the mid point 5*m* (earth) and the corresponding main terminal (5*c*, 5*d*).

However, the fact that the output terminal 70*d* is connected to the corresponding auxiliary terminal of the transformer presents particular advantages.

In the first place, the power absorbed by each circuit 7*a*, 7*b* is reduced to a minimum. In effect, this has a value $P=v\times I$, where "v", in this case, is only a fraction of a volt (corresponding to the saturation potential of the transistor 72 for each circuit 7*a*, 7*b*) whereas, in accordance with the first and second embodiments shown respectively in FIGS. 1 and 3, where the output terminal 70*d* is connected to the earth, this dissipated power, being proportional to $V_2$, reaches values ten to twenty times larger, taking into consideration the normal values for $V_1$, that is, in the order of 24 volts, for example, ($V_2$ then having a value of approximately 8 volts).

In the second place, by connecting the output terminal 70*d* of each absorption circuit 7*a*, 7*b* to the auxiliary terminal of the secondary, that is, to potential $V_2$ which is exactly the potential to which the corresponding conductor must be forced during the absorption stage, the dissipated power for the heater units which must not be controlled for printing is established at a given controlled value, in this case, equal to 1/9 of the power dissipated by the heater units controlled. If the output terminal 70*d* was connected to the secondary of the transformer at a point such that the potential is noticeably greater than $V_2$, certain non-controlled heater units could be supplied with a potential such that the power dissipated would not be determinable and would be, in any case, equal to a fraction of P appreciably greater than P/9.

Also, in accordance with the embodiment shown in FIG. 6, the voltage supply terminal 70*a* for each absorption circuit is connected to the corresponding main terminal (5*c*, 5*d*) for the secondary. The fact that this terminal 70*a* is connected to an existing terminal of the secondary (that is, the main terminal) simplifies the design of the device. As an alternative, this terminal could be connected to an auxiliary voltage source U, higher than $V_2$, for example, at any point of the secondary situated between the secondary terminal and the main terminal. In particular, in order to maximise the energy load analysis, it could be connected to a point on the secondary such that the voltage U is slightly greater, by several volts, for example, to the voltage $V_2$. In effect, for each absorption circuit, the power "p" dissipated by passage of the base current $I_B$ for transistor 72 is $p=I_B.(U_o-V_1/3)$, where "$U_o$" is the voltage at the base of the transistor, as 70*d* is connected to $V_2=V_1/3$. In order to take into account the voltage drop between the terminal 70*a* and the base of transistor 72, terminal 70*a* could preferably be connected to a potential which slightly exceeds $V_2$. For example, when $V_1=24$ volts ($V_2=8$ volts) a voltage U of approximately 10 volts would be advantageous.

Also, it should be noted that each absorption circuit (represented in FIG. 7) is of simple design and does not require a voltage follower as the voltage for the second conductor in particular is controlled to the value for $V_2$ resulting from providing a shunt or bypass for the diodes 6*c* and 6*d*, in order to pass the current to the auxiliary terminals.

The zero change detector 8 for the alternating voltage may comprise any device, well known to persons skilled in the art, which receives directly the alternating voltage supplying the primary 5a of transformer 5, or the potential from at least one of the conductors 1 and 2.

It is assumed, on referring to FIGS. 3 and 6, that this detector 8 is an analog - to - digital converter connected to the potential of conductor 1 and periodically supplying microprocessor 9 with a digital indication of this potential.

The microprocessor 9 receives the message M to be printed and then controls, in accordance with known techniques, the selective closing of switches or cutouts such as 4a, designed to permit heating of the units such as 3a. It also initiates the operations described on referring to FIG. 8. These operations are capable of several variants in their arrangement, as would be evident to persons skilled in the art, but they are functionally linked to the device covered by the invention insofar as the heating sequences for the heater units such as 3a must, in order to provide a satisfactory impression, be synchronised with the alternating voltage supplied to transformer 5.

Figure 8:
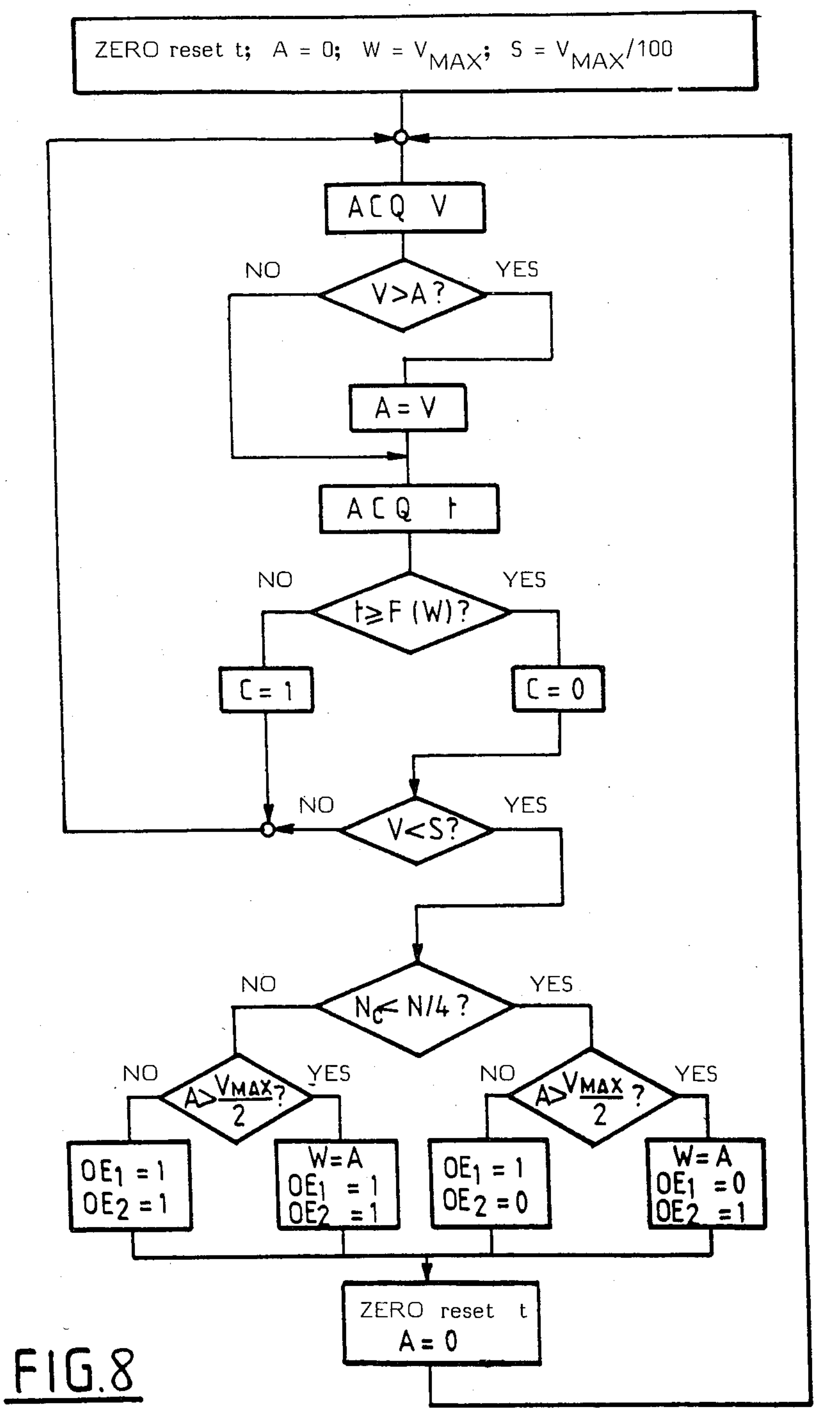
FIG. 8 is a flow chart explaining the functions comprising the control unit used in the device of FIGS. 3 and 6.

In FIG. 8, "t" represents a time variable supplied by a continuous operation clock capable of being reset to zero at any required time and "A" is a variable intended to represent the peak amplitude of the potential measured by the converter 8; "W" is the last known peak value for the potential $V_1$ and "$V_{MAX}$" the theoretical peak value for the potential $V_1$; "S" is a threshold value very close to zero and, for example, arbitrarily fixed at $V_{MAX}/100$; "V" the instantaneous potential measured by the converter 8; "F" a function linking the peak value W to the time the heating stage for the heater units must be controlled; "C" is a logic variable where the value "one" represents an authorisation to heat the heater units and the value "zero" is an inhibition; "$N_c$" is the number of heater units where the heater stage is controlled at the point being considered, this number depending, as is known, on the message M received by the microprocessor 9 and, "N" is the total number of heater units for the head 3.

An initialisation stage consists of resetting the variables "t" and "A" to zero and defining "W" and "S". The ACQ V operation consists of obtaining, from converter 8, the digital information representative of V, the variable A being made equal to V if this is found to be less than the latter value. The operation ACQ t consists of obtaining, from the continuous operation clock, the time information t. As long as the time variable t is not equal to or exceeds the time necessary for heating, taking into account the peak value W for the potential $V_1$, the heating stage is authorised (C=1) and the preceding cycle, as described, is repeated. In effect, when W is low, the heating time must be correspondingly longer in order that the printed impression may be uniform irrespective of variations in the supply voltage.

If the heating time is exceeded (C=0), the microprocessor monitors the next zero change for the voltage $V_1$, by comparing the instantaneous potential V with the threshold value S. As long as V exceeds or equals S, the preceding cycle is repeated, as described.

If the condition "V is less than S" is satisfied, this indicating a zero change for $V_1$, the microprocessor has two connection choices, depending on whether Nc is or is not less than N/4. In the second case (Nc exceeds or is equal to N/4), the microprocessor inhibits any current absorption by fixing $OE_1$ and $OE_2$ at 1 (high level). Also, W is given the value of the variable A if this at least exceeds $V_{MAX}/2$, this indicating that the half-cycle elapsed corresponds to the presence of the potential $V_1$ in the conductor 1. In the other case, that is, when Nc is less than N/4, the microprocessor permits current to be absorbed in the circuits 7a or 7b, depending on whether the half-cycle elapsed corresponded to the presence of a potential $V_1$ in the conductor 1 or in the conductor 2. In addition, W is given the value of the variable A in the first of these two cases.

After resetting time "t" to zero (RAZ 6), together with the variable A, the complete cycle, as described, is repeated.

Strictly speaking, for the particular embodiments shown in FIGS. 3 and 6, the converter 8 is only a zero change detector when it functions in association with the microprocessor 9. In effect, the final zero change detection signal is the internal logic signal for the microprocessor which corresponds to the status of this latter when the condition "V is less than S" is verified. However, it is the converter 8 which provides the microprocessor with the information V at the time when this condition is verified. This information V is, in itself, a zero change signal. For this reason, the converter 8 is considered to qualify as a zero change detector.

Figure 9:
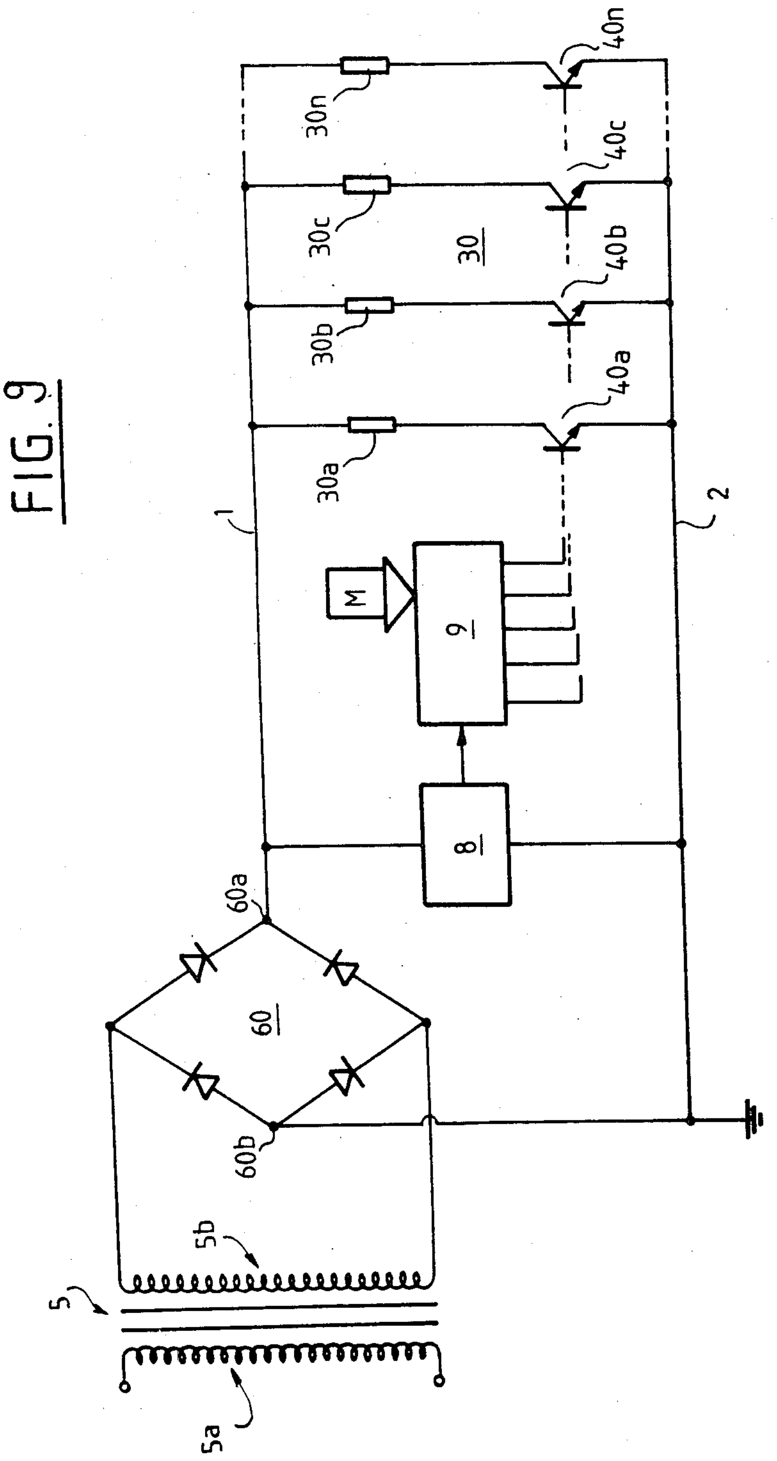
FIG. 9 illustrates a fourth device using the method covered by the invention.

FIG. 9 illustrates a fourth method for producing the invention. In this case, the invention consists of using an alternating voltage source to supply, without filtering, a thermal printing head and may be used with thermal printing heads of any type, that is, not only with heads provided with two common conductors, as described up to the present time, but also with, for example, thermal printing heads provided with one only common conductor, as shown in FIG. 9. The device in FIG. 9 comprises a transformer 5, associated with a diode rectifier bridge 60, where the terminals for the rectified current 60a and 60b are connected to the conductors 1 and 2. The second conductor 2 is connected to the earth.

The thermal printing head 30 includes heater units such as 30a, 30b, directly connected to the first conductor 1 and connected to the second conductor 2 through control transistors such as 40a, 40b.

As in the case of the devices illustrated in FIGS. 1, 3 and 6, a zero change detector 8 enables a control unit such as a microprocessor 9 to synchronise the heating stage of the heater units with the periods or cycles of rectified voltage.

In this way, the method described in accordance with the invention comprises the operations which consist of rectifying the alternating voltage, detecting the zero changes for the alternating voltage or the rectified voltage, supplying a detection signal and synchronising the heating stage for particular heater units on this detection signal (see also FIG. 8).

An essential advantage of the invention lies in the fact that, as the supply devices described are not provided with the normal design of control filter in order to provide a temporary but considerable storage of eneryg, the thermal energy to be dissipated is very low. The absence of electronic power components operating at a high temperature increases the reliability of the unit. Also, no voltage reduction component is used to supply the head, which eliminates the risk of an overvolt condition due to failure of that component and which would be capable of destroying the head.

We claim:

1. Device for supplying a thermal printing head comprising adjoining pairs of heater units, where the first and second heater units of each pair are connected to the first and second conductors respectively and capable of being raised, in that order or in the reverse order, to first and second potentials and where any heater unit is capable of being connected to a third potential, so that it may be subjected to a relatively high, or relatively low, temperature rise, depending on whether it is, or is not, directly connected between the first and third potentials, characterised in that, in order to permit connection to a source of alternating voltage, this device includes:

an input transformer which is designed to receive the alternating voltage and which comprises, on the one hand, a secondary winding provided with a mid-point connected to the earth and, on the other hand, at least first and second main output terminals, situated on the secondary winding on each side of the mid-point and respectively connected to the first and second conductors, first and second current rectifier units respectively introduced between the first and second output terminals of the transformer and the first and second conductors, and first and second current absorption circuits respectively connected to the first and second conductors and capable of absorbing at least part of the current circulating respectively in the second and first conductors.

2. Device in accordance with claim 1, characterised in that the transformer also includes, on the one hand, first and second auxiliary output terminals, respectively arranged on the secondary winding between the said mid-point and the said first and second main output terminals and respectively connected to the second and first conductor and, on the other hand, the third and fourth current rectifier units respectively introduced between the said second and first auxiliary terminals and the said first and second conductors.

3. Device in accordance with claim 2, characterised in that each current absorption circuit includes a voltage follower designed to maintain the potential for the conductor to which it is connected at basically the same value as for the potential for the auxiliary terminal to which that conductor is connected.

4. Device in accordance with claim 1, characterised in that each current absorption circuit includes an active component capable of being controlled in order that it may adopt either an electrically conductive state or an electrically non-conductive state, this component being capable of permitting or inhibiting the said current absorption, depending on its state.

5. Device in accordance with claim 2, characterised in that the respective output terminals of the first and second current absorption circuits are each connected to the secondary of the transformer of the transformer, respectively between the second and first main terminals and the earth.

6. Device in accordance with claim 5, characterised in that the respective output terminals of the first and second current absorption circuits are connected to the secondary winding of the transformer at a point situated close to the second and first auxiliary terminals respectively.

7. Device in accordance with claim 6, characterised in that the respective output terminals of the first and second absorption circuits (is) are respectively connected to the second and first auxiliary terminals for the secondary.

8. Device in accordance with claim 4, characterised in that the first and second current absorption circuits each include a current input terminal connected to the first, an output terminal and a voltage supply terminal connected to a potential with a value considerably greater than the potential of the respective second and first auxiliary terminals for the secondary of the transformer.

9. Device in accordance with claim 8, characterised in that the respective voltage supply terminals of the first and second absorption circuits are respectively connected at a point on the secondary of the transformer situated between the second and first auxiliary terminals and the second and first main terminals.

10. Device in accordance with claim 9, characterised in that said point situated on the secondary corresponds to a potential exceeding that of the corresponding auxiliary terminal, by a value of between 5 and 50 per cent of the latter, and preferably between 20 and 30 per cent.

11. Device in accordance with claim 8 characterised in that the voltage supply terminals of the first and second current absorption circuits are respectively connected to the second and first main terminals for the secondary.

12. Device in accordance with claim 1, characterised in that it includes a control unit capable of connecting at least one of said heater units to the third potential and a zero change detector responsive to the alternating voltage and capable of supplying a time base signal to said control unit.

13. Device in accordance with claim 4, characterised in that it includes a control unit capable of connecting at least one of said heater units to the third potential and a zero change detector responsive to the alternating voltage and capable of supplying a time base signal to said control unit and wherein said control unit controls said active component in order to authorise the absorption of current when the number of heater units controlled is less than one-quarter of the total number of heater units for the head.

14. Device in accordance with claim 1, characterised in the second potential is between 25 and 50 per cent, preferably 33 per cent, of the first potential and that the third potential is that of the earth.

* * * * *